(12) United States Patent
Liatsa et al.

(10) Patent No.: US 11,480,951 B2
(45) Date of Patent: Oct. 25, 2022

(54) METHOD AND DEVICE FOR PRODUCING A PRODUCT AND COMPUTER PROGRAM PRODUCT

(71) Applicant: Siemens Aktiengesellschaft, Munich (DE)

(72) Inventors: Athina Liatsa, Herzogenaurach (DE); Thomas Mittermeier, Nuremberg (DE); Henning Ochsenfeld, Nuremberg (DE); Liam Pettigrew, Petersham (AU)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/296,307

(22) PCT Filed: Oct. 30, 2019

(86) PCT No.: PCT/EP2019/079624
§ 371 (c)(1),
(2) Date: May 24, 2021

(87) PCT Pub. No.: WO2020/119999
PCT Pub. Date: Jun. 18, 2020

(65) Prior Publication Data
US 2022/0026889 A1 Jan. 27, 2022

(30) Foreign Application Priority Data
Dec. 11, 2018 (EP) .................................. 18211722

(51) Int. Cl.
*G05B 19/418* (2006.01)
*G05B 13/02* (2006.01)
(52) U.S. Cl.
CPC ... *G05B 19/41875* (2013.01); *G05B 13/0265* (2013.01); *G05B 2219/32368* (2013.01)

(58) Field of Classification Search
CPC .......... G05B 19/41875; G05B 13/0265; G05B 2219/32368
See application file for complete search history.

(56) References Cited

U.S. PATENT DOCUMENTS

| | | | | |
|---|---|---|---|---|
| 3,885,421 A | * | 5/1975 | Nakamura | G01N 3/00 73/824 |
| 4,116,043 A | * | 9/1978 | Pencak | G01M 3/24 73/40 |

(Continued)

FOREIGN PATENT DOCUMENTS

| | | |
|---|---|---|
| CN | 1366449 A | 8/2002 |
| CN | 103369952 A | 10/2013 |

(Continued)

OTHER PUBLICATIONS

PCT International Search Report and Written Opinion of International Searching Authority dated Jan. 24, 2020 corresponding to PCT International Application No. PCT/EP2019/0796240.

(Continued)

*Primary Examiner* — Thomas C Lee
*Assistant Examiner* — Michael Tang
(74) *Attorney, Agent, or Firm* — Lempia Summerfield Katz LLC (57) ABSTRACT

The disclosure relates to a method and a device for producing a product and to a computer program product. The product is produced in at least one production step. A quality control check is optionally carried out after at least one of the production steps to determine a quality index of the product in question. To save on the quality control check, a quality indicator of the product in question is determined using production data. The production data are advantageously provided by sensors. The quality indicator of the product in question may be calculated using an adaptive algorithm. The adaptive algorithm may be taught and/or (Continued)

improved using quality indices of a quality control unit and the corresponding production data. The adaptive algorithm may be taught with the aid of a further computing unit, in particular in a cloud.

21 Claims, 5 Drawing Sheets

(56) References Cited

U.S. PATENT DOCUMENTS

| | | | |
|---|---|---|---|
| 6,269,179 B1 * | 7/2001 | Vachtsevanos | G01N 21/88 348/126 |
| 2003/0150909 A1 | 8/2003 | Markham et al. | |
| 2014/0064445 A1 | 3/2014 | Adler | |
| 2015/0370175 A1 | 12/2015 | Nicolaides et al. | |
| 2017/0123411 A1 * | 5/2017 | Cheng | G05B 19/41875 |
| 2018/0049356 A1 * | 2/2018 | Mori | G05B 19/41875 |
| 2018/0284091 A1 | 10/2018 | Levanon | |
| 2018/0292812 A1 | 10/2018 | Baseman et al. | |
| 2018/0307203 A1 * | 10/2018 | Aizawa | G05B 19/4083 |
| 2019/0362221 A1 * | 11/2019 | Ando | G06V 10/993 |

FOREIGN PATENT DOCUMENTS

| | | | | |
|---|---|---|---|---|
| CN | 103400221 A | * | 11/2013 | |
| CN | 103826385 A | * | 5/2014 | |
| CN | 104022603 A | * | 9/2014 | |
| CN | 104039084 A | | 9/2014 | |
| CN | 106649907 A | | 5/2017 | |
| CN | 107734955 A | | 2/2018 | |
| CN | 108665134 A | | 10/2018 | |
| CN | 108733027 A | | 11/2018 | |
| JP | 02119088 A | * | 5/1990 | |
| KR | 20170020453 A | * | 2/2017 | ......... G01N 21/9503 |
| WO | 2014039644 A1 | | 3/2014 | |
| WO | 2018150210 A1 | | 8/2018 | |

OTHER PUBLICATIONS

European Search Report for European Application No. 18211722.6-1213 dated May 15, 2019.

* cited by examiner

METHOD AND DEVICE FOR PRODUCING A PRODUCT AND COMPUTER PROGRAM PRODUCT

The present patent document is a § 371 nationalization of PCT Application Serial No. PCT/EP2019/079624, filed Oct. 30, 2019, designating the United States, which is hereby incorporated by reference, and this patent document also claims the benefit of European Patent Application No. 18211722.6, filed Dec. 11, 2018, which is also hereby incorporated by reference.

BACKGROUND

US 2017/123411 A1 discloses a method and a system for analyzing causes of variation in a manufacturing process in order to identify a main reason for defective products. Hereby, a classifier is used to classify the respectively manufactured product on the basis of manufacturing process data.

US 2018/284091 A1 discloses the monitoring of the production of a food product. For this purpose, sensor data (e.g., images) are conveyed to a control system. These images are compared with stored data, the maintenance of a quality level being determined dependent upon this comparison.

WO 2018/150210 A1 discloses the assessment of a manufactured semiconductor substrate in that an image of the semiconductor substrate is acquired and evaluated. Thereby, an item of information regarding the quality of the semiconductor substrate produced is provided.

US 2018/307203 A1 discloses the determination of an error relating to a machined surface of a workpiece dependent upon a test result. Thereby, the test result may include an image feature of the workpiece.

US 2018/292812 A1, US 2014/064445 A1, and US 2003/150909 A1 disclose the technological background of the present disclosure.

During the manufacturing of a product, following the production and/or after individual production acts, for example, a quality control check is carried out. The quality control check takes place, for example, with an imaging method, wherein on the basis of a generated image, it is established whether the product produced meets the quality requirements. In the case, in particular, of products for which an imaging of exteriors of the product is not sufficient, images may be created with the aid of X-ray radiation.

Disadvantageously, the quality control check may be complex and sometimes demands high safety standards. In particular, the use of X-ray radiation during the quality control check is disadvantageous. In addition, a quality control check represents a significant cost factor.

SUMMARY AND DESCRIPTION

Accordingly, it is an object of the disclosure to reduce the complexity in the production of a product.

The object is achieved with a method, with the aid of a computer program product, and with an apparatus as disclosed herein. The scope of the present disclosure is defined solely by the appended claims and is not affected to any degree by the statements within this summary. The present embodiments may obviate one or more of the drawbacks or limitations in the related art.

The method includes producing a product in a production act or in a plurality of production acts. The method further includes, in each case, a provision of production data during at least the one production act, in particular, with the aid of at least one sensor. The method further includes calculating a quality indicator on the basis of the respective production data and association of the quality indicator with the respective product.

A product is understood to be a circuit board equipped with electrical and/or electronic components.

A production act may be understood to be, inter alia, the winding of an insulated conductor, the application of a solder paste onto a circuit board, an insulation of an electrical conductor, the positioning and/or fastening of components to one another.

Production data may be: measurements of the product; a position of a component, in particular, in relation to the position of other components; a position and/or a deviation from a target position of a fastening component or device such as an adhesive or a solder paste; a location and quantity of an insulating component or device on an electrical conductor; a strength of a connection of two components; a flow quantity; or a rotary speed or a torque.

In relation to the production of the circuit board, production data is the position of a solder paste on the circuit board, the deviation of the applied solder paste in relation to a target position or a target pattern, the thickness of the applied layer of the solder paste, a temperature or an air humidity of the respective environment of the product, or a combination thereof.

Production data may be determined by a sensor. Alternatively or additionally, production data may be determined on the basis of control data or control commands.

A sensor may be configured as a camera, a temperature sensor, a position sensor, a distance sensor, a vibration sensor, or as a flow sensor.

The quality indicator may indicate whether the product meets the quality requirements. A quality indicator may be representable with "0" or "1" (in a dual representation). In certain examples, "0" means that the respective product does not meet the quality requirements and "1" means that the respective product meets the quality requirements.

The quality indicator states, for example, whether all the connections of the components are adequately formed. The quality indicator may also state whether a product will be functional after the production.

The calculation of the quality indicator may take place with the aid of a computer program product, the computer program product being installed and/or executable on a computing unit.

The calculation of the quality indicator takes place on the basis of the production data. The calculation may take place with a learning-capable algorithm. Alternatively or additionally, the algorithm may also have generic portions.

A quality check following after the production acts may advantageously be at least partially omitted. In particular, a quality control unit may be relieved or even omitted.

In an advantageous embodiment, the respective quality indicator may be associated with the respective product with the aid of a database or a marking on the product.

The association of the respective quality indicator with the respective product may be applied to the product with a QR code or a bar code. Alternatively or additionally, the quality indicator may be associated with the product with the aid of a RFID chip.

The database may be associated with the computing unit, the database entries for the respective product including a quality indicator corresponding to the product.

The association of the quality indicator with the respective product serves for better classification of the respective product.

In a further advantageous embodiment, after at least one production act, a quality control check takes place, wherein during the quality control check, a quality index is associated with the respective product.

The quality control check is advantageously carried out by a quality control unit. Advantageously, the quality control check takes place after performance of the production acts.

Through the quality control check, a quality index is associated with the respective product. The quality index indicates whether the respective product meets the quality requirements. The quality index is advantageously representable in a dual representation. Similarly to the quality indicator, "0" may mean that the respective product does not meet the quality requirements. A quality index equal to "1" may mean that the respective product meets the quality requirements.

The calculation of the quality indicator may be checked by the quality control check. In particular, in the calculation of the quality indicator with the aid of a learning-capable algorithm, the learning-capable algorithm may be taught and/or improved with the aid of the quality index.

Through the use of a quality control check, the consistent quality of the respective product may be provided even in the event of a failure of the computing unit which determines the quality indicator.

In a further advantageous embodiment, the quality indicator is determined with the aid of a learning-capable algorithm, the learning-capable algorithm being teachable by a comparison of production data, the quality indices and optionally the respective quality indicator.

A learning-capable algorithm is advantageously taught with the aid of a comparison of the respective quality indicator of a product with the determined quality index of the same product. With the self-learning algorithm, a plurality of different products may have a quality indicator applied to them.

The learning-capable algorithm may advantageously be carried out on a computing unit, the computing unit being associated with at least one production unit.

A computing unit of this type may be configured as an EDGE device.

Advantageously, a further computing unit serves for teaching the learning-capable algorithm. The further computing unit may be configured as a decentralized server, in particular, as a cloud. During teaching, a comparison of the quality indicator with the quality index advantageously takes place, taking account of the production data.

Through the use of a self-learning algorithm, the calculation of the quality indicator may be improved in a stepwise manner.

In a further advantageous embodiment, the learning-capable algorithm is taught in such a way that the respective quality indicator corresponds to the respective quality index of the respective product.

The respective quality index of the respective product serves to teach the learning-capable algorithm. The respective quality index may be provided by the quality control unit. A particularly efficient teaching of the learning-capable algorithm takes place by a comparison of the respective quality index with the respective quality indicator.

Advantageously, the teaching may take place independently of the operation of the apparatus and/or of the learning-capable algorithm. Thus, only minimal resources of the computing unit are required for determining the production indicator.

In a further advantageous embodiment, the quality indicator and/or the quality index of the respective product is displayed to a user, the user being able to select, on the basis of the quality indicator, what will be done with the product.

Advantageously, a user decides on the basis of the quality indicator whether a product meets the respective quality requirement.

Advantageously, the display of the quality indicator of the respective product takes place with a recommendation so that the user issues just one clearance.

The decision of the user as to whether a quality requirement of a product is met with a particular quality indicator may also serve for teaching the learning-capable algorithm.

Through the inclusion of the user, the algorithm for calculating the quality indicator may be improved.

In a further advantageous embodiment, on the basis of the quality indicator and/or the selection by the user, it is decided whether a quality control check of the product takes place.

Through the inclusion of the user, the efficiency of the quality control check may be improved, in particular, during the teaching of the algorithm.

The user may advantageously support the learning-capable algorithm with his or her input.

In a further advantageous embodiment, at least one sensor determines at least one environmental influence, wherein the sensor provides the environmental influence as a portion of the production data.

Aside from the production data, environmental influences may affect the quality of the respective product.

Environmental influences may include ambient temperature, air humidity, or vibrations or shaking.

The respective environmental influence is advantageously determined with a sensor which is associated with the respective production unit.

A determination and taking into account of the respective environmental influence may significantly improve the determination of the respective quality indicator. The learning-capable algorithm may thus be improved.

In a further advantageous embodiment, the production data includes the position and characteristic of a fastening component or device, in particular, a position and a quantity of an applied solder paste or a position and/or a quantity of an insulation material.

The durability of a product is advantageously defined by the fastening of components to one another. The lifespan of an electric machine or a product with an electrical conductor may be dependent upon the characteristic of a poor quality layer of the electrical conductor.

In particular during the production of assembled circuit boards, contacting of the components to the circuit board is of decisive significance for the quality of the product. Therefore, the examination of the application of the solder paste is decisive for the later quality and durability of the circuit board equipped with components.

Particularly in the production of circuit boards, the contacting of the components with the circuit board may be predetermined on the basis of the position and/or thickness of the solder paste applied.

Furthermore, the insulation of an electrical conductor, in particular, a conductor in a winding determines the lifespan of the electric machine.

In a further advantageous embodiment, the learning-capable algorithm is based upon a decision tree, a neural network and/or a support vector algorithm.

Because a relationship between the production data and the respective quality indicator may not be completely generically determinable, a learning-capable algorithm for associating the quality indicator is advantageous.

A learning-capable algorithm based upon a decision tree includes a branched structure which accepts at an input site the production data associated with the respective production act. Advantageously, the decision tree has inputs for the production data associated with the product. The production data is linked on the basis of initially estimated parameters. Advantageously, a plurality of such decision trees, each having a different structure, serve for calculation of the respective quality indicator. The quality indicator is the result of the linked production data. The parameters are determined by a comparison of the production data with the corresponding quality index. The respective quality index for the respective production data is provided during the teaching of the decision tree. The determination of the respective parameters may take place with the aid of a cyclically executing teaching process, wherein advantageously different production data is compared with the quality index of the product in each cycle. After execution of a plurality of cycles, the self-learning algorithm may calculate a quality indicator on the basis of the production data, said quality indicator corresponding to a quality index of the respective product.

Furthermore, the self-learning algorithm may include a neural network. The neural network may also be taught cyclically by a comparison of production data of the respective product with the quality index of the product. A neural network may include a plurality of layers, wherein the respective layer includes at least one neuron. During teaching of the neural network, the linkages of the neurons to one another are parameterized. The neural network has an input layer for the uptake of the production data and an output layer for the output of the quality indicator.

A support vector machine may also be provided for calculating the respective quality indicator. The respective production data may be represented as vectors in an affine space, as a collection of points. Herein, each vector represents a product. The individual production data items $x1, \ldots, xn$ form an n-dimensional space which includes the respective vector. During teaching of the support vector machine, the quality indicator is associated with the respective production data. The respective quality index exists in a dual representation and is either "0" or "1". Through the teaching, a hyperplane is determined which divides the production data into two portions: on one side, the production data with a quality indicator of "0" and the production data with the quality indicator "1" on the other side of the hyperplane.

Through the definition of the hyperplane, new production data may be assigned rapidly and easily to one of the two quality indicators.

Advantageously, a combination of a plurality of the aforementioned learning-capable algorithms may be put to use.

Through the use of at least one of the aforementioned algorithms, a quality indicator may be determined particularly easily.

In a further advantageous embodiment, the quality control check includes an optical or X-ray optical method and/or an electrical check of the product.

The quality control check is advantageously carried out in a quality control unit. The quality control unit serves to establish whether the product meets the quality requirements. The quality control unit serves to provide the quality index for the respective product.

The respective quality index may be associated with the respective product. The quality index is advantageously provided to the computing unit and/or a further computing unit. The further computing unit may serve for teaching the learning-capable algorithm.

Advantageously, in the quality control check, with the aid of an optical or an X-ray optical method, an image of the respective product may be recorded. Advantageously, the quality index of the respective product is determined from the image. The image may be evaluated as to whether a solder connection adequately connects the components to be soldered.

An optical or X-ray optical method may take place during the checking of circuit boards, in particular, printed circuit boards.

Alternatively or additionally, an electrical check may take place to ascertain the insulation of the electrical conductor. An electrical check advantageously takes place such that an electric voltage is applied to individual points of an electrical conductor and it is determined whether the correct electrical voltage exists at another site.

An electrical check is advantageous in the checking of an adequate insulation of an electrical conductor. Particularly in the use of an electrical conductor in a winding of an electric machine, faulty functioning of the electric machine may be prevented with such a quality control check.

With the aid of the disclosure, such quality checks may be reduced to a minimum. In this way, a quality check which may sometimes be complex, may be omitted without disadvantages having to be accepted in the quality of the respective product.

In a further advantageous embodiment, the product includes an electrical circuit on a circuit board, in particular a printed circuit board.

An advantageous use of the method described above is the production of circuit boards.

In the production of circuit boards, a solder paste is applied to electrical conductors that are positioned on the circuit board. After positioning the electrical and/or electronic components on the circuit board, the connection of the electrical and/or electronic components advantageously takes place by melting the solder paste.

In a conventional production method for circuit boards, a quality control check takes place after the melting of the solder paste. With the aid of the quality control check, it is established whether the solder connections meet the quality requirements.

Through the use of the disclosure, the quality control check may be greatly reduced or may even be omitted. Quality control units may thus be spared.

In a further advantageous embodiment, with the aid of a conversion module, production data from a plurality of different sensors is convertible to a data type, in particular, a common data type.

Different types of sensors may provide different data types. In order to provide a rapid and reliable determination of the quality indicator, the different data types are converted to a common data type.

Through the conversion, production data relevant to the respective product may be extracted. By way of example, values are extracted from image data.

Data types may be image files, XML files, text files, or ASCII files. Advantageously, a disassembly of XML data into the portions relevant for the provision of the quality indicator takes place.

The conversion of the different data types takes place with a so-called parsing method. The parsing method converts each data type into a common data type and thereby advantageously provides similar production data.

In a further advantageous embodiment, on the basis of the quality indicator provided, a production act is adapted.

Advantageously, a change of the respective production act takes place if a preceding production act possibly fails to meet the quality requirements of the product.

If a solder connection may not meet the quality requirements for the respective product, during the application of the solder paste, the relevant site may be corrected with an increased application of solder paste and thereby an improvement of the quality may be brought about.

If during the quality control check and/or in the calculation of the quality indicator, it is established that an insulation layer is too weakly configured in a particular region, the application of the insulation at precisely this site may be reinforced.

In general, with the learning-capable algorithm, a feedback of the findings to the respective production act may take place.

The possibility is created so to adapt the respective production act in a self-learning manner that the quality of the respective product is increased.

The computer program product is configured for execution on a computing unit, the computer program product being provided for carrying out a method described here.

The computer program product may be storable on a computer-readable medium. The computer program product may be loaded into the working memory of a computing unit for execution of the method described herein and is executed with a processor of the computing unit.

Advantageously, the computer program product includes the learning-capable algorithm. The learning-capable algorithm may be taught with the aid of a further computing unit.

The computer program product may advantageously run at least partially on the control unit of the respective production unit or on an apparatus for producing the product.

The apparatus serves for producing a product. The apparatus includes a production unit or a plurality of production units for producing the product. The apparatus further includes a computing unit for calculating and/or providing a quality indicator of the respectively produced product, wherein the calculation and/or provision of a quality indicator being provided with the aid of a method described herein. The apparatus further includes a data acquisition component or device for providing production data for the computing unit.

The computing unit may also be assigned exclusively to the apparatus. The connection of the apparatus to the computing unit takes place via a technical data connection such as an Intranet or an Internet.

Advantageously, the computer program described above is installed on the computing unit and is capable of being executed.

The computing unit serves to provide the respective quality indicator on the basis of the production data.

The production data is advantageously determined on the basis of control signals for the respective production unit. Alternatively or additionally, production data is provided with the aid of sensors. The sensors are advantageously associated with the respective production unit.

A sensor may be configured as a position sensor, a camera, a detector for acquiring a movement, a humidity sensor, or a temperature sensor.

At least one production act may take place in a production unit. Advantageously, a transfer of the product from a production unit to a further production unit takes place after the completion of the at least one production act that is associated with the production unit.

A quality control check of the product may take place after passage through the production units and/or after the respective production act.

With the aid of the apparatus, a product may be produced particularly rapidly and economically, because the quality control check may be, at least partially, omitted.

In a further advantageous embodiment, the apparatus further includes a quality control unit, wherein the quality control unit is configured for determining a quality index of the respective product.

The quality control unit advantageously provides the respective quality index of the product. The provision may take place in the computing unit. Advantageously, the respective quality index is associated with the respective product. The association may take place with the aid of a database.

Through the determination of the quality index, the learning-capable algorithm may be improved and/or the calculation of the quality indicator may be checked.

In a further advantageous embodiment, the computing unit and the quality control unit are configured cooperative or are operable cooperatively, such that the quality indicator provided by the computing unit and the quality index provided by the quality control unit assume the same value.

The cooperation advantageously takes place through the teaching of the learning-capable algorithm. The learning-capable algorithm may be improved by the provision of the respective quality index of the respective product to the computing unit or to a further computing unit.

The aim of the improvement of the learning-capable algorithm is that the quality indicator corresponds to the quality index with a probability approaching "1".

The cooperation advantageously takes place through the teaching of the learning-capable algorithm on the further computing unit, in particular the cloud.

In a further advantageous configuration, the cooperation of the quality control unit and the computing unit takes place in such a way that during a project planning of the apparatus for producing the product, the quality control unit may be configured so that only a predeterminable portion of the products require a quality control check without the quality requirement of the respective product being undershot.

A cooperation of the quality control unit and the computing unit may take place through the continuous teaching of the learning-capable algorithm. A taught learning-capable algorithm which is installed on a computing unit may advantageously at least partially replace the quality control unit with the aid of production data.

A project planning of the apparatus advantageously take place such that a determination of the quality indicator increases the quantity of products produced with the aid of the learning-capable algorithm because a throughput limitation of the quality control unit is omitted.

Because a quality control unit may be significantly more expensive than a computing unit, the apparatus for producing the product may be configured in a cost-saving way.

In a further advantageous embodiment, the respective data acquisition component or device is configured as a sensor.

In a further advantageous embodiment, the apparatus has a screen which is configured for the display of the respective quality index and/or the respective quality indicator and wherein the user may decide, on the basis of the displayed quality index, what happens to the respective product.

In a further advantageous embodiment, the computing unit is coupled to a further computing unit, in particular, a decentralized server or a cloud, the further computing unit being provided for teaching the learning-capable algorithm.

The further computing unit advantageously serves for acquiring production data and the corresponding quality indices of the corresponding products. The further computing unit advantageously includes the database.

Through the further computing unit, the computing unit which is associated with the production unit may be configured to be less powerful.

In a further advantageous embodiment, the apparatus serves for the production of circuit boards with components. The production data serves to describe an application of a solder paste to the circuit board, the quality indicator and/or the quality index being provided for describing an adequate contacting of the components to the circuit board after a soldering process.

The quality control unit advantageously serves for checking the respective connection of the respective component to the electrical conductor of the circuit board.

The quality indicator indicates in this exemplary embodiment, by way of example, whether all the contacts between the circuit board and the respective component are configured according to the quality requirements.

Thus, for example, on an application of the solder paste with too great a spacing from the contact element of the respective component, it may be assumed that the distantly applied solder paste is not sufficient to enable an adequate contacting.

In a further advantageous embodiment, the quality index of the respective product is confirmable with the aid of the quality control unit, in particular, with an optical and/or X-ray optical method.

The optical or X-ray optical method serves, for example, for checking how well the solder connection has been formed. According to a visual check of a solder joint, the distribution of the metal (released from the solder paste) may be determined with the aid of the quality control unit.

Advantageously, with the aid of the quality control unit, merely a confirmation of the quality indicator takes place. The matching of the respective quality indicator to the corresponding quality index may be checked. The checking advantageously takes place with a statistical evaluation.

Through the confirmation of the respective quality indicator, it may advantageously be determined how well the learning-capable algorithm has been taught.

In a further advantageous embodiment, a first production unit is provided for applying a solder paste to a circuit board, wherein at least one second production unit is provided for equipping the circuit board with components, wherein a third production unit is configured as an oven which serves to form an electrical connection of the circuit board to the respective component with the aid of the solder paste.

The solder paste advantageously includes metal particles in a viscous medium. In the first production act, an application of the solder paste onto the circuit board takes place. The solder paste may be applied in the regions where a solder connection takes place between the components and the circuit board.

In a second production act, the components are positioned and/or fastened on the circuit board. The second production act takes place in a second production unit, wherein the second production unit is configured, for example, as a component placement machine.

In a third production act, the circuit board is warmed in an oven so that the solder paste forms a stable solder connection between the circuit board and the respective component.

According to the prior art, after the passage through the oven, a quality control check takes place with the aid of a quality control unit. In order to spare the quality control unit, the determination of the quality indicator advantageously takes place according to a method described herein.

The production of circuit boards may take place without a quality control unit.

In a further advantageous embodiment, the production unit is configured for the insulation of an electrical conductor, in particular, a winding for an electric machine, wherein the quality index and/or the quality indicator are each a measure for the insulation of the conductor.

Advantageously, electrical conductors are insulated before the winding of a coil or a winding, on the surface thereof. The insulation of the electrical conductor advantageously serves to protect further components, such as a laminated core, against physical contact with the electrical conductor.

In particular, before the use of the winding in the stator or in the rotor of an electric machine, a testing of the insulation takes place. The testing of the insulation advantageously takes place by applying an electric voltage and point-wise measurement of electric potentials on the winding or on other components.

Such an electric test is complex and may advantageously be partially omitted through the determination of the quality indicator.

In a further advantageous embodiment, the apparatus includes at least two production lines, each production line including a production unit or a plurality of production units, the at least two production lines each including production units for the production of the respective product, and a quality control unit being associated with the at least two production lines, the at least two production lines using the quality control unit, the quality control unit being configured only for the quality control checking of a quantity of products of a single production line.

The production lines advantageously serve for producing at least similar products. The production lines may be associated with a quality control unit.

Advantageously, the at least two production lines produce a quantity of products which would not be checkable for the respective quality requirements by a single quality control unit.

Through the calculation of the quality indicator of the respective product, the quality control unit may be relieved. Thereafter, the association of a quality control facility with a plurality of production lines is possible through the calculation of the respective quality indicator.

Advantageously, a computing unit is associated with the production lines jointly. The learning-capable algorithm is advantageously installed on the computing unit. The learning-capable algorithm determines the respective quality indicator for each of the products of the at least two production lines.

Advantageously, each production line may be associated with a dedicated computing unit. The teaching of the learning-capable algorithm may take place on a further computing unit, in particular, with the aid of a decentralized computing unit.

Advantageously, depending upon the teaching state of the learning-capable algorithm, the respective quality indicator of the respective product may be determined. Provided the teaching state is adequate, the determination of the respective quality index may be dispensed with. Therefore, a plurality of production lines may be associated with one quality control unit.

In a further advantageous embodiment, the apparatus includes: a first quantity of production units with a maximum production capacity of a second quantity of products per time unit. The apparatus further includes a third quantity of quality control units for determining the respective quality indices of the respective products, wherein a monitoring capacity of the third quantity of quality control units per time unit forms a fourth quantity, and wherein the product of the first quantity and the second quantity is smaller than the fourth quantity.

A time unit may be a minute or an hour. The production units may serve for producing a product, wherein the production units may be configured in a parallel manner for producing products.

With the aid of the first quantity of production units, for example, a second quantity of products may be produced per time unit.

With the third quantity of quality control units, a fourth quantity of quality control units only may be produced.

With the aid of the disclosure, it is possible that despite the providing of the quality requirements of the product, fewer products are tested than are produced. With the aid of the disclosure, therefore, either no quality control checking with the aid of a quality control unit is necessary or only a reduced quality control checking of a reduced quantity of products.

Through the use of the disclosure, it is possible to reduce the capacity of quality control facilities.

A further possible solution of the object as mentioned in the introduction may be a computer-readable medium which includes the aforementioned computer program product.

The computer-readable medium may be configured as a CD-ROM, a DVD-ROM, or as a USB stick.

Alternatively or additionally, the computer program product may be provided for download via the Internet and from there may be stored on a local hard disk of the computing unit or the further computing unit, and/or executed.

A data processing product may also serve to achieve the aforementioned object, the data processing product being configured for teaching the learning-capable algorithm described above, the teaching of the learning-capable algorithm including a comparison of production data and the respective quality index of the product.

The data processing product may be installed on the further computing unit and is capable of executing thereon.

BRIEF DESCRIPTION OF THE DRAWINGS

The disclosure will now be described and explained in greater detail making reference to the drawings. The embodiments illustrated in the drawings are merely exemplary and in no way restrict the disclosure. Individual features shown in the drawings may be combined into new embodiments. In the drawings.

DETAILED DESCRIPTION

Figure 1:
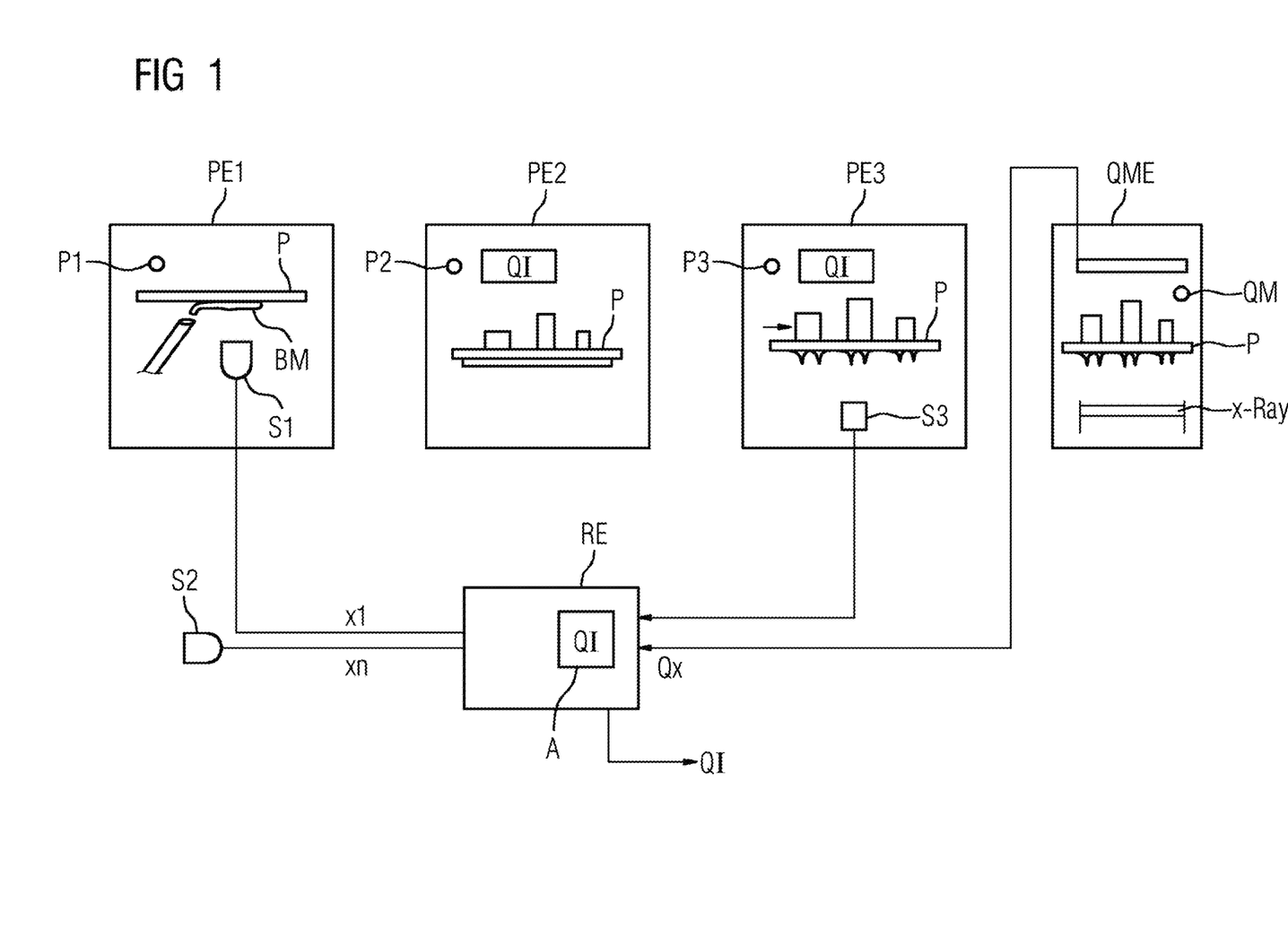
FIG. 1 depicts an exemplary apparatus.

FIG. 1 depicts an exemplary apparatus. The apparatus includes three production units PE1, PE2, PE3. The apparatus further includes a quality control unit QME. In the first production unit PE1, a first production act P1 takes place. During the first production act P1, a fastening component or device BM is applied to a product P. A possible fastening component or device BM is an adhesive or a solder paste. A first sensor S1 acquires the location and the quantity of the fastening component or device BM applied to the product P. The first sensor S1 provides the production data X1 of the first production act P1 to the computing unit RE. The product P is then passed to a second production unit PE2.

A second sensor S2 serves herein for determining an environmental influence such as a temperature or the air humidity. Advantageously, an acquisition of the environmental influence takes place insofar as the environmental influence influences one of the production acts P1, P2, P3.

In the second production unit PE2, a second production act P2 takes place. In the second production act P2, the product P is further processed. A quality index QI is also associated with the product P. The quality index QI is provided by the computing unit RE and is associated with the product P during its passage through the production acts. The product P is passed on to a third production unit PE3. In the third production unit PE3, a third production act P3 takes place. A third sensor S3 is associated with the third production unit PE3.

After the execution of the third production act P3, a quality control check QM takes place in a quality control unit QME. The quality control unit QME includes a further sensor which is configured to check the quality index QI of the respective product P. The quality control check QM is performed here with the aid of an X-ray analysis. In this case, the further sensor is configured as an X-ray detector.

Advantageously, with the aid of the quality index QI associated with the product P, it may be decided whether or not a quality control check QM in the quality control unit QME is necessary for the product P after its passage through the third production unit PE3.

Figure 2:
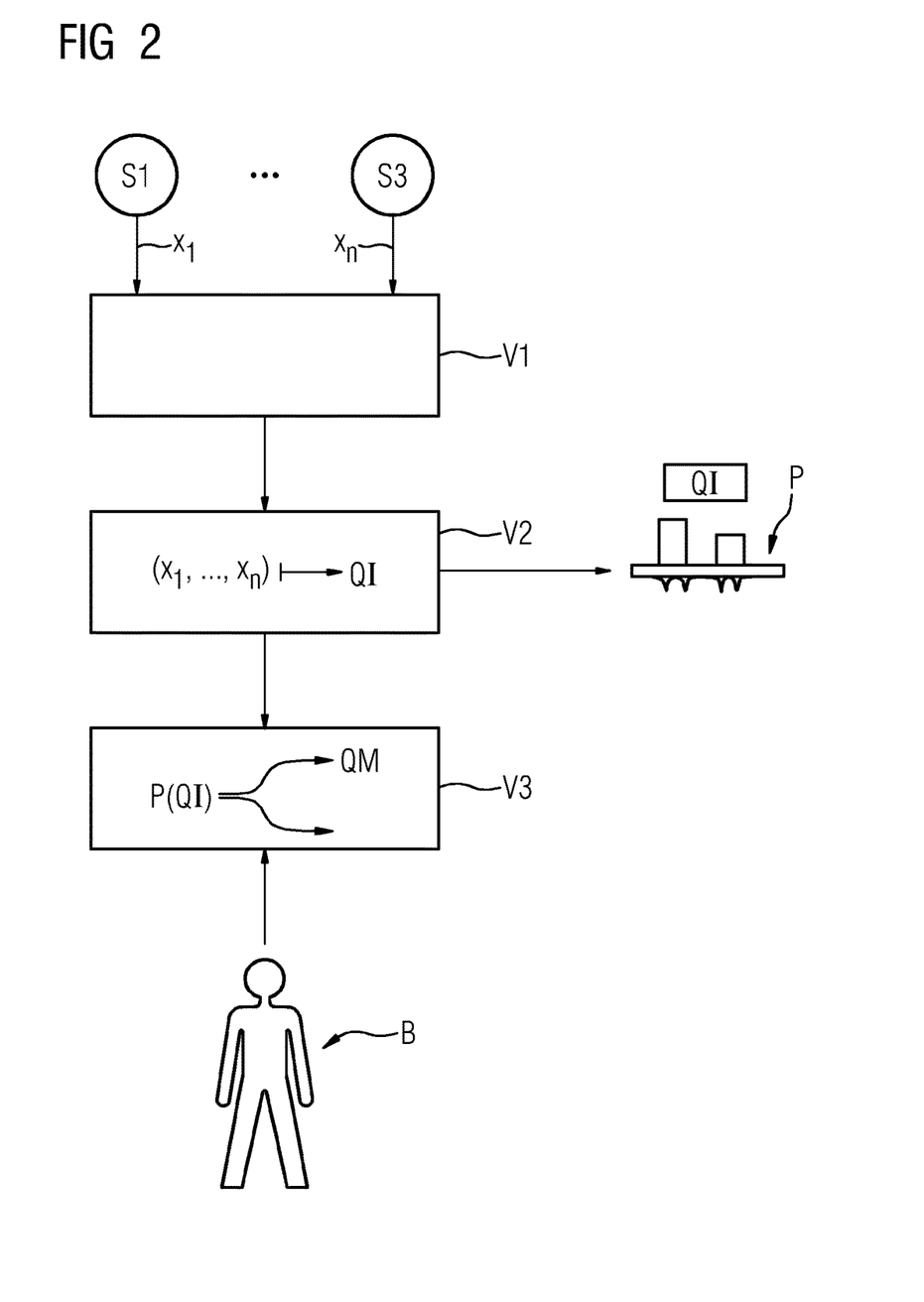
FIG. 2 depicts an exemplary method.

FIG. 2 depicts an exemplary method. In a first method act V1, production data x1, . . . , xn from sensors S1, S2, S3 is provided to a computing unit RE. Optionally, in the first method act V1, the production data x1, . . . , xn is converted to a uniform data type. In a second method act V2, with the aid of the learning-capable algorithm A, the quality index QI is calculated from the production data x1, . . . , xn. The quality index QI is associated with the respective product P, during the production of which the production data x1, . . . , xn has been determined. The association of the quality index QI with the product P may take place through entry into a database (not shown) or through a marking of the quality index QI on the product P itself. In a third method act V3, on the basis of the quality index QI, it is decided whether or not a quality control check QM takes place for the respective product P. In the decision of whether a quality control check QM takes place, a user B may also confirm, on the basis of a quality index QI displayed to him or her, the execution of a quality control check QM.

Figure 3:
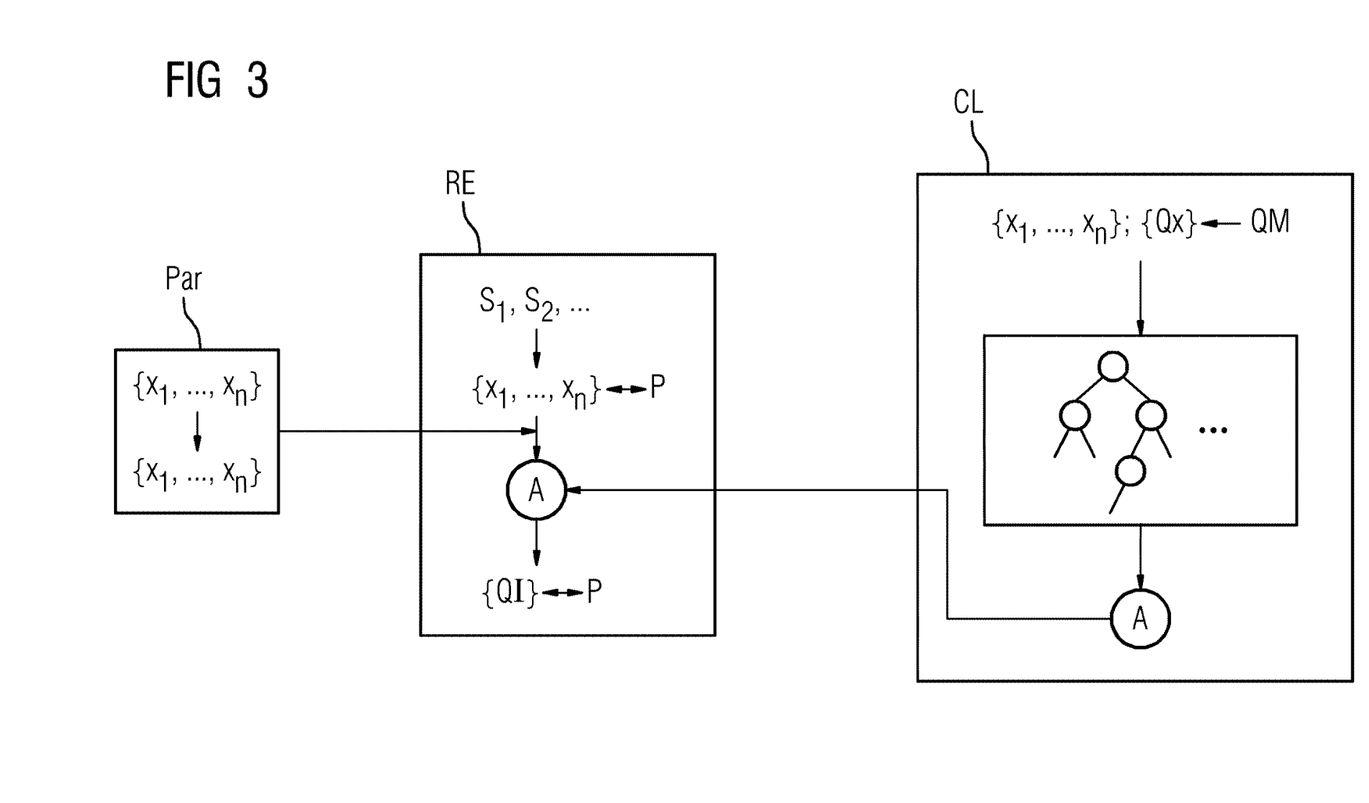
FIG. 3 depicts an exemplary learning-capable algorithm.

FIG. 3 depicts an exemplary learning-capable algorithm A. The algorithm A serves for calculation of the quality index QI from the production data x1, . . . , xn. The production data x1, . . . , xn is determined during the production of the respective product by the sensors S1, S2, S3. After the calculation of the respective quality index QI, this quality index QI is associated with the product P.

Optionally, with the aid of a conversion module Par, a conversion of the production data x1, ..., xn into a uniform data type takes place. The production data x1, ..., xn in the uniform data type is fed to the learning-capable algorithm A.

In order to improve the learning-capable algorithm A, teaching of the learning-capable algorithm advantageously takes place. The teaching of the learning-capable algorithm A may take place in a further computing unit CL, for example, a cloud. In order to improve the learning-capable algorithm A, measured production data x1, ..., xn is compared with quality indices QI which have been determined in a quality control check QM. Both the production data x1, ..., xn and also the associated quality indices QI are provided to a neural network, an algorithm on the basis of artificial intelligence, or a support vector algorithm. The learning-capable algorithm A is improved by the comparison of the production data X1, ..., xn determined with the aid of sensors and the quality index QI which is also determined experimentally. A regular exchange of the learning-capable algorithm A of the computing unit RE with the trained, learning-capable algorithm A from the further computing unit CL may take place.

Figure 4:
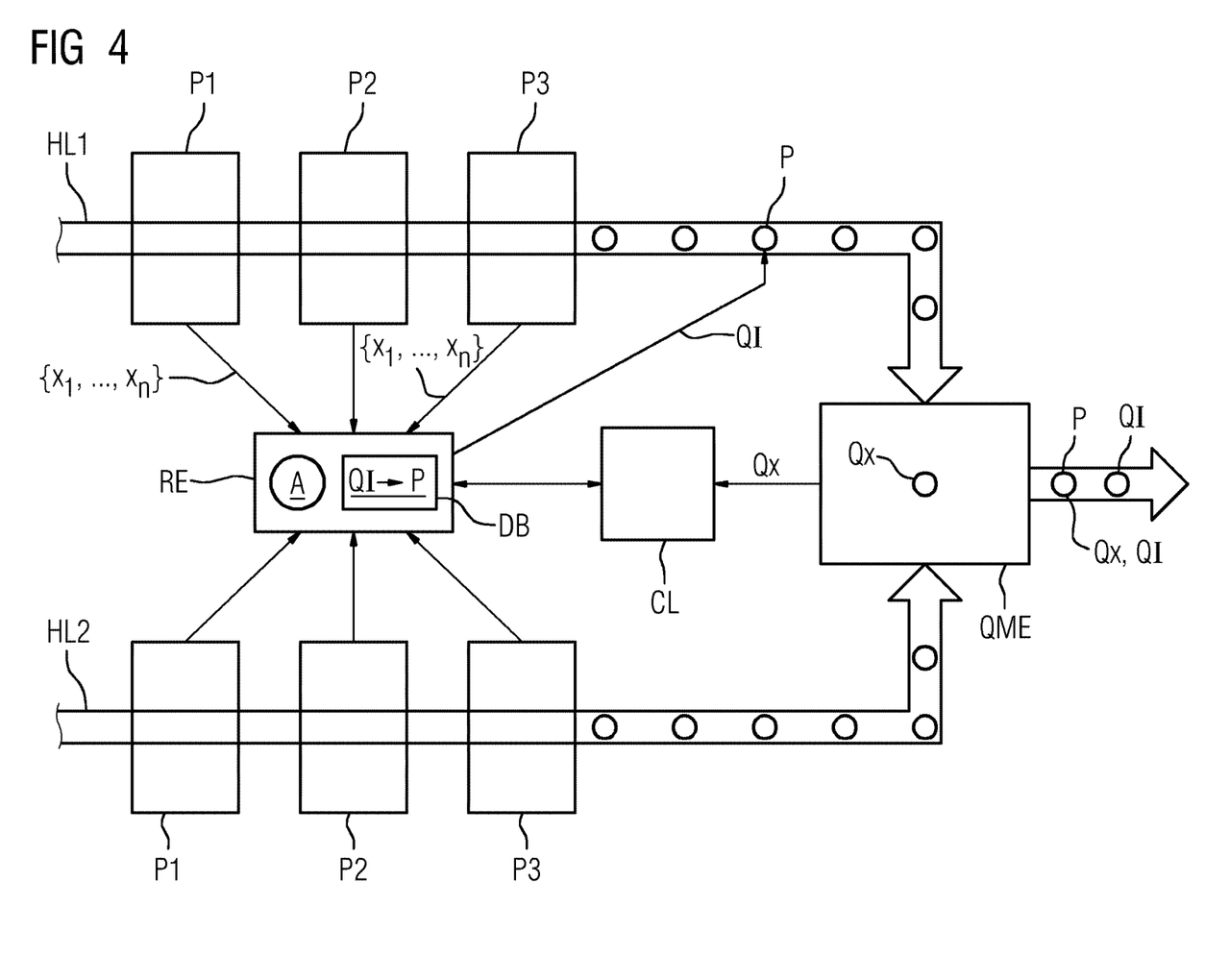
FIG. 4 depicts a further exemplary apparatus.

FIG. 4 depicts a further exemplary apparatus. The apparatus includes two production lines HL1, HL2 and a quality control unit QME.

The first production line HL1 and the second production line HL2 each include three production units PE1, PE2, PE3. The production units PE1, PE2, PE3 each serve for producing products P.

The production units PE1, PE2, PE3 each provide production data x1, ..., xn to a computing unit RE. The computing unit RE serves for determining a quality indicator QI for the respective product P. The quality indicator QI is associated with the respective product P. The association advantageously takes place with the aid of a database DB.

A learning-capable algorithm A, (e.g., in the form of a computer program product), is installed on the computing unit RE. With the aid of the learning-capable algorithm A, the computing unit provides a quality indicator QX for the respective product.

The learning-capable algorithm A may be taught with the aid of a further computing unit CL. The further computing unit CL is advantageously at least partially linked in a data-conducting manner to the computing unit RE. The computing unit RE provides the production data x1, ..., xn to the further computing unit CL.

The products P from the first production line HL1 and the second production line HL2 are provided to a quality control unit QME.

The quality control unit QME serves for quality control checking QM of individual products P. The quality control unit QME then associates a quality index QX with a portion of the products P. The quality control unit QME provides the respective quality index QX for the respective product to the further computing unit CL. The further computing unit CL advantageously serves for a comparison of the quality indicators QI with the respectively determined quality index QX.

Through the comparison of the quality index QX with the corresponding quality indicator QI, the further computing unit CL may check how good the determination of the quality indicator QI is.

Figure 5:
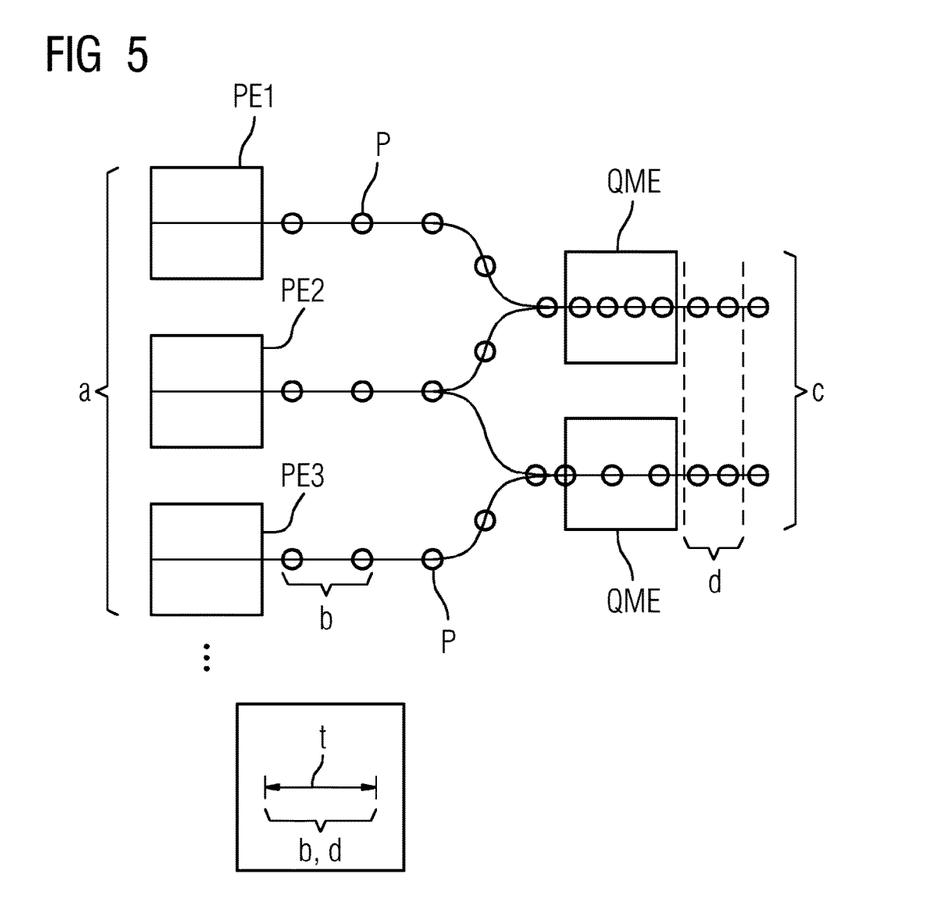
FIG. 5 depicts a further exemplary apparatus.

FIG. 5 depicts a further exemplary apparatus. The apparatus includes a first quantity a of production units PE1, PE2, PE3. In the example shown, the first quantity a is two. The first quantity of production units PE1, PE2, PE3 is configured for producing a second quantity b of products P per time unit t. The second quantity is shown here as two, e.g., a production unit PE1, PE2, PE3 may produce a maximum of two products per time unit t.

For example, the three production units PE1, PE2, PE3 jointly produce six products per time unit t.

The six products P per time unit t are provided to a third quantity c of quality control units QME. The quality control units QME may carry out, for example, just one quality control check QM of a fourth quantity d of products P in the time unit t. In this example, the fourth quantity is four. Thereafter, a larger quantity of products P, specifically the product of the first quantity a and the second quantity b of products P, pass through a quality control check QM in one of the quality control units QME. The product of the first quantity a and the second quantity b is advantageously greater than the overall capacity of the quality control units QME. The capacity is specifiable by the fourth quantity d. In the example shown here, the fourth quantity is four and is thus smaller than the product of the first quantity a and the second quantity b (a*b=6).

By virtue of the disclosure, with the aid of the calculation and the association of the respective quality indicator with the respective product P, the productivity of the apparatus may advantageously be increased.

Summarizing, the disclosure relates to a method and an apparatus for producing a product P, as well as a computer program product. The product P is produced in at least one production act P1, P2, P3. Optionally, after at least one of the production acts P1, P2, P3, a quality control check QM takes place to determine a quality index QX of the respective product P. In order to spare the quality control check QM, a determination of a quality indicator QI of the respective product P takes place on the basis of production data x1, ..., xn. The production data x1, ..., xn is advantageously provided by sensors S1, S2, S3. The calculation of the quality indicator QI of the respective product P advantageously takes place with the aid of a learning-capable algorithm A. The learning-capable algorithm A may be taught and/or improved with quality indices QX from a quality control check QM and the corresponding production data x1, ..., xn. The teaching of the learning-capable algorithm A may take place with the aid of a further computing unit CL, in particular, in a cloud.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described in detail with the exemplary embodiments, the disclosure is not restricted by the examples disclosed and other variations may be derived therefrom by a person skilled in the art without departing from the protective scope of the disclosure.

The invention claimed is:

1. A method comprising:
  producing a circuit board in at least one production step;
  providing production data during each production step of
    the at least one production step, wherein the production data is a position of an applied solder paste on the circuit board, a deviation of the applied solder paste in relation to a target position or a target pattern, a thickness of a layer of the applied solder paste, a temperature or an air humidity of an environment of the circuit board, or a combination thereof;

conducting a quality control check after at least one product step in which a quality index is associated with the circuit board;

calculating a quality indicator based on the production data with aid of a learning-capable algorithm;

associating the quality indicator with the circuit board, wherein the learning-capable algorithm is teachable such that the quality indicator corresponds to the quality index of the circuit board;

calculating a quality indicator for a production of a next circuit board with aid of the learning-capable algorithm; and applying the quality indicator for the production of the next circuit board.

2. The method of claim 1, wherein the quality indicator is associated with the circuit board with aid of a database or a marking on the circuit board.

3. The method of claim 1, wherein the quality indicator and/or the quality index of the circuit board is displayed to a user, and wherein, based on the quality indicator, a selection of what is to happen to the circuit board is configured to be provided by the user.

4. The method of claim 3, further comprising:

determining whether a quality control check of the circuit board is to take place based on the quality indicator and/or the selection by the user for the production of the next circuit board.

5. The method of claim 1, wherein at least one sensor determines at least one environmental influence, and wherein the at least one sensor provides the at least one environmental influence as a portion of the production data.

6. The method of claim 1, wherein the production data comprises a characteristic of a fastening device, wherein the characteristic is a position and a quantity of the applied solder paste or a position and/or quantity of an insulation material.

7. The method of claim 1, wherein the learning-capable algorithm is based upon a decision tree, a neural network, a support vector analysis, or a combination thereof.

8. The method of claim 1, wherein the quality control check comprises an optical or an X-ray optical method and/or an electrical check of the circuit board.

9. The method of claim 1, wherein production data from a plurality of different sensors is convertible to a common data type.

10. The method of claim 1, wherein, based on the calculated quality indicator, a production step is adapted.

11. A non-transitory computer program product for execution on a computer, wherein, when executed on the computer, causes the computer to:

produce a circuit board in at least one production step;

provide production data during each production step of the production of the circuit board, wherein the production data is a position of an applied solder paste on the circuit board, a deviation of the applied solder paste in relation to a target position or a target pattern, a thickness of a layer of the applied solder paste, a temperature or an air humidity of an environment of the circuit board, or a combination thereof;

conducting a quality control check after at least one product step in which a quality index is associated with the circuit board;

calculate a quality indicator based on the production data with aid of a learning-capable algorithm;

associate the quality indicator with the circuit board, wherein the learning-capable algorithm is teachable such that the quality indicator corresponds to the quality index of the circuit board;

calculate a quality indicator for a production of a next circuit board with aid of the learning-capable algorithm; and apply the quality indicator for the production of the next circuit board.

12. An apparatus for producing a circuit board, the apparatus comprising:

a production unit or a plurality of production units for producing the circuit board;

a computer for calculating and/or providing a quality indicator of the circuit board;

a data acquisition device for providing production data for the computer, wherein the calculating and/or the providing of the quality indicator comprises:

the producing of the circuit board;

the providing of the production data during each production step of at least one production step of the production of the circuit board, wherein the production data is a position of an applied solder paste on the circuit board, a deviation of the applied solder paste in relation to a target position or a target pattern, a thickness of a layer of the applied solder paste, a temperature or an air humidity of an environment of the circuit board, or a combination thereof;

conducting a quality control check after at least one product step in which a quality index is associated with the circuit board;

calculating the quality indicator based on the production data with aid of a learning-capable algorithm;

associating the quality indicator with the circuit board, wherein the learning-capable algorithm is teachable such that the quality indicator corresponds to the quality index of the circuit board;

calculating a quality indicator for a production of a next circuit board with aid of the learning-capable algorithm; and applying the quality indicator for the production of the next circuit board.

13. The apparatus of claim 12, further comprising:

a quality control unit configured for determining the quality index of the circuit board.

14. The apparatus of claim 13, wherein the computer and the quality control unit are configured cooperative or are operable cooperatively such that the quality indicator provided by the computer and the quality index provided by the quality control unit assume a same value.

15. The apparatus of claim 14, wherein the quality index of the circuit board is confirmable with aid of the quality control unit via an optical and/or X-ray optical method.

16. The apparatus of claim 12, wherein the data acquisition device is configured as a sensor.

17. The apparatus of claim 12, wherein the computer is coupled to a decentralized server or a cloud, and wherein the decentralized server or the cloud is configured for teaching the learning-capable algorithm.

18. The apparatus of claim 12, wherein the apparatus is configured to produce the circuit board with components,
- wherein the production data is provided to describe an application of the solder paste to the circuit board, and
- wherein the quality indicator and/or the quality index is provided for describing an adequate contacting of the components with the circuit board after the application of the solder paste to the circuit board.

19. The apparatus of claim 12, wherein a first production unit of the plurality of production units is provided for applying the solder paste to the circuit board,
- wherein a second production unit of the plurality of production units is provided for equipping the circuit board with components,
- wherein a third production unit of the plurality of production units is configured as an oven, and
- wherein the oven is configured to form an electrical connection of the circuit board with a component of the components with aid of the solder paste.

20. The apparatus of claim 12, wherein the production unit is configured for insulating an electrical conductor, via a winding for an electric machine, and
- wherein the quality index and/or the quality indicator are each a measure for an insulation of the electrical conductor.

21. The apparatus of claim 12, wherein the apparatus comprises a first quantity of production units with a respective maximum production capacity of a second quantity of circuit boards per time unit,
- wherein the apparatus comprises a third quantity of quality control units for determining the quality indices of the circuit boards,
- wherein a monitoring capacity of the third quantity of quality control units per time unit forms a fourth quantity of quality control units,
- wherein a multiplication of the first quantity of production units and the second quantity of circuit boards is smaller than the fourth quantity of quality control units.

* * * * *